United States Patent [19]

Razdow

[11] Patent Number: 5,469,538
[45] Date of Patent: Nov. 21, 1995

[54] MATHEMATICAL DOCUMENT EDITOR AND METHOD PERFORMING LIVE SYMBOLIC CALCULATIONS FOR USE WITH AN ELECTRONIC BOOK

[75] Inventor: Allen M. Razdow, Cambridge, Mass.

[73] Assignee: Mathsoft, Inc., Cambridge, Mass.

[21] Appl. No.: 206,307

[22] Filed: Mar. 4, 1994

Related U.S. Application Data

[63] Continuation-in-part of Ser. No. 204,841, Mar. 2, 1994.

[51] Int. Cl.$^6$ ...................................... G06F 17/00
[52] U.S. Cl. ........................... 395/140; 395/145; 395/147
[58] Field of Search .................... 395/140, 144, 395/1, 149, 155, 156, 161, 650, 150, 500, 600; 364/709.12, 710.11, 709.01, 709.06, 709.14, 710.14

[56] References Cited

U.S. PATENT DOCUMENTS

| | | | |
|---|---|---|---|
| 4,386,412 | 5/1983 | Ito | 364/710.14 |
| 4,811,257 | 3/1989 | Sumitani et al. | 364/709.01 |
| 4,845,652 | 7/1989 | Bunsen | 364/709.14 |
| 4,852,057 | 7/1989 | Patton | 364/709.06 |
| 4,972,334 | 11/1990 | Yamabe et al. | 395/500 |
| 5,067,102 | 11/1991 | Eisenstein | 364/709.12 |
| 5,127,104 | 6/1992 | Dennis | 395/650 |
| 5,175,700 | 12/1992 | Vogel et al. | 364/710.11 |
| 5,189,633 | 2/1993 | Bonadio | 364/709.12 |
| 5,233,685 | 8/1993 | Landes et al. | 395/147 |
| 5,251,292 | 10/1993 | Martel, Jr. et al. | 395/150 |
| 5,265,242 | 11/1993 | Fujisawa et al. | 395/600 |
| 5,285,400 | 9/1994 | Stent et al. | 364/709.14 |

OTHER PUBLICATIONS

M. Levine et al., "On Beyond Spreadsheets," *MacUser*, Nov. 1990, vol. 6, No. 11, p. 148 (12).
B. Simon, "It's Not Just for Mainframes Anymore: Symbolic Math Software," *PC Magazine*, Aug. 1992, vol. 11, No. 14, p. 405 (16).
R. Knaus, "Symbolic Simplification," *AI Expert*, Jun. 1991, vol. 6, No. 6, p. 21 (4).
"Mathcad 3.1 User's Guide Windows Version", Mathsoft, Inc., Cambridge, Mass.
B. Simon, "Mathcad 4.0: 32–Bit Power For Ultimate Math Scratch Pad", *PC Magazine*, Jun. 29, 1993, pp. 37–38.
B. Simon, "Math Software for the Rest of Us", *PC Magazine*, Aug. 1992, p. 412.
P. C. Altidis, "Mathcad 3.0: Fast, Powerful, Easy to Use", *Design News*, May 18, 1992, p. 136.
M. Witten, "Mathcad 3.1: A Math–Savvy Whiteboard", *SunWorld*, Oct. 1992, p. 72.

*Primary Examiner*—Almis R. Jankus
*Attorney, Agent, or Firm*—Kenyon & Kenyon

[57] ABSTRACT

A mathematical document editor that can perform live symbolic calculations. The mathematical document editor is capable of placing mathematical expressions at any position on a computer screen, that represents a printed document. A symbolic dependency graph is maintained such that it always reflects the mathematical dependencies on the computer screen. Any expression which includes a symbolic evaluation operator is evaluated by a symbolic algebra engine, taking into account all the definitions and constraints upon which the expression depends. If an expression is modified, introduced or deleted, the symbolic dependency graph is used to determine which expression containing the symbolic evaluation operator need to be modified. The present invention ensures that the document is 'up to date' in the sense that all expressions, including those requiring symbolic calculations, are consistent with all antecedent expressions upon which they depend.

22 Claims, 7 Drawing Sheets

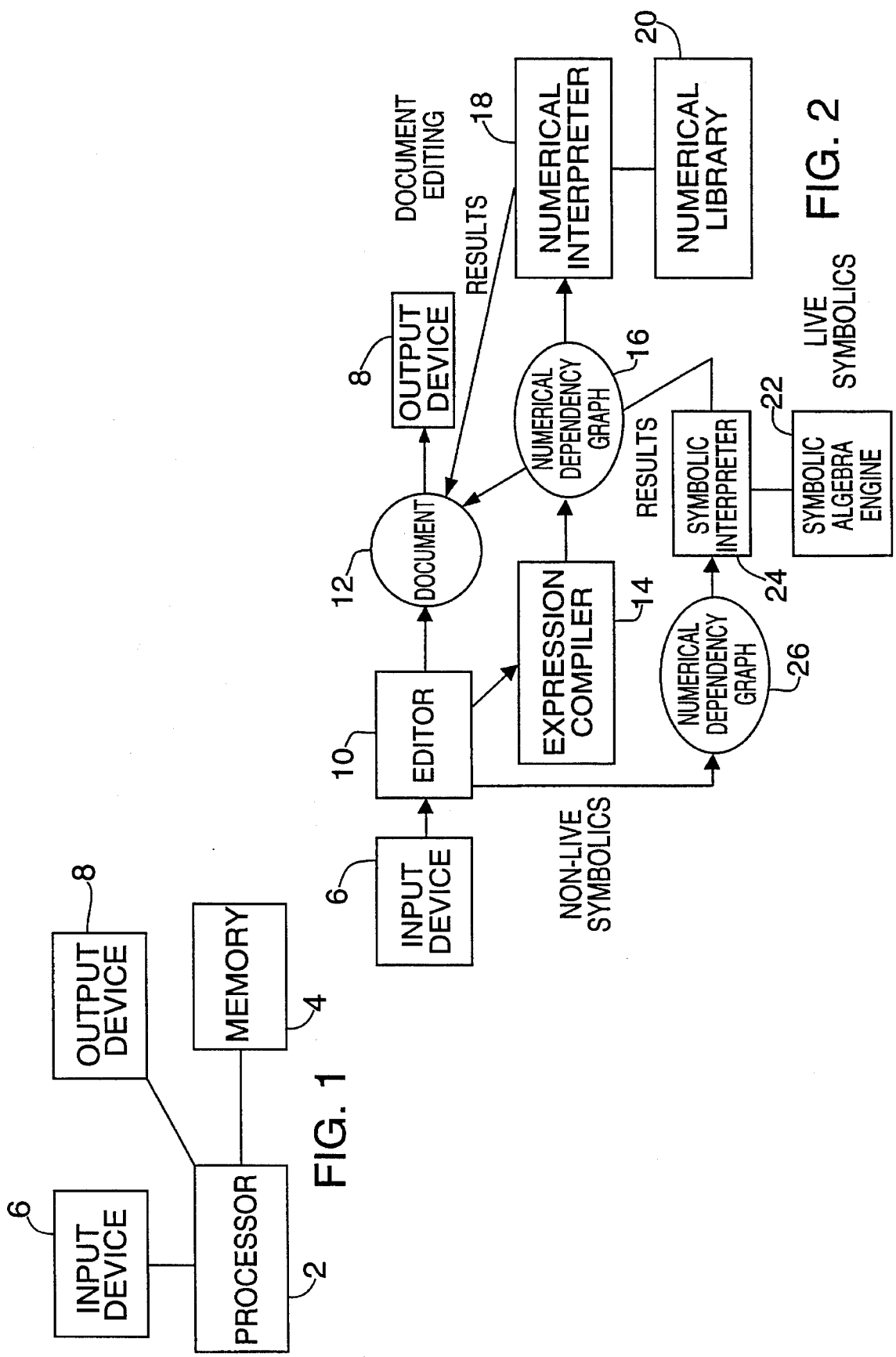

File Edit Text Math Graphics Symbolic Window Books Help $y = 3 \quad x = 3$
$y = 2 \quad m = 1 \ldots 10$ expand $(x + 1)(x - 1) \longrightarrow 8$ ⟵ substitutes the value of 3 for x before evaluating this expression.

expand $(y + 1)(y - 1) \longrightarrow y^2 - 1$ ⟵ Since y is defined twice, evaluates this expression symbolically.

assume x expand $(x + 1)(x - 1) \longrightarrow x^2 - 1$ ⟵ Although x is defined to be 3, ignores the definition because of the keyword "assume" followed by "x"

$m \longrightarrow m$ ⟵ Since m is defined as a range variable, ignores the definition.

assume $\alpha > 0, x$ $x \int_0^\infty e^{-\alpha t} dt \longrightarrow \dfrac{x}{\alpha}$ ⟵ Since α is constrained to be positive, integral converges. Since x follows "assume" the definition for x above is ignored.

FIG. 6

File Edit Text Math Graphics Symbolic Window Books Help f(x) := sin [x]

g(t) := $\int_0^1 f(t \cdot x) \, dx \quad \frac{-\cos(t)}{t} + \frac{1}{t}$ ...the symbolic evaluation and...

...the numerical evaluation...

g(π) = 0.637

← Changing this definition changes both x := 3    x := 1
assume x, y expand
    b := $(x = y)^3$  b := $x^3 + 3 \cdot x^2 \cdot y + 3 \cdot x \cdot y^2 + y^3$
    b = 64

← Changing these definitions updates only the last result.

FIG. 8

MATHEMATICAL DOCUMENT EDITOR AND METHOD PERFORMING LIVE SYMBOLIC CALCULATIONS FOR USE WITH AN ELECTRONIC BOOK

RELATED APPLICATION

This application is a continuation-in-part of application Ser. No. 08/204 841, filed Mar. 2, 1994.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention is directed to a computer-based method and apparatus for performing symbolic calculations, and in particular, to a mathematical document editor that is capable of performing live symbolic calculations in real-time.

BACKGROUND OF THE INVENTION

Present computer controlled systems and mathematical document editors allow users to enter expressions and equations, including symbolic expressions, in documents on a computer system and to perform calculations using these expressions and equations. For example, the well known Maple symbolic engine developed by Waterloo Maple Software, Inc. of Ontario, Canada, and the Mathematica program produced by Wolfram, Inc., are computer programs that allow users to enter complex mathematical expressions and calculate results. Both these products use sequential command line input, where the sequence in which the expressions are entered has meaning and is relevant to the result calculated. In these systems, there is no logical connection between the output and the input unless the user makes the connection. Each expression is entered and processed in the order that it is entered. If a user wishes to modify a previously entered expression, the user can, for example, place the cursor on that expression on the screen, modify the expression, and then reenter the modified expression. However, if the user wishes the modification (or the result of the modified expression) to affect or be applied to other previously entered expressions, the user must then reenter those expressions.

Specialized computer systems and mathematical document editors exist for performing mathematical and statistical calculations that allow input to be entered "freeform" in any order and placed in any position on the computer screen, herein called "mathematical document editors". The input can be mathematical, scientific and statistical expressions, as well as text, diagrams and graphs. In these systems, the document on which the expressions are entered can be considered to be a virtual white board. The expressions are entered by a user on the white board (i.e., the open document displayed on the computer screen), using known graphical user interfaces, such as, for example, the user interface of Microsoft, Inc.'s Windows operating system. A document can be displayed, printed, edited, and saved as a file in a computer memory.

A user can enter expressions in the form that the user would write such expressions on the white board or sheet of paper, using common mathematical notations, rather than in the form of statements or equations used in programming languages or spreadsheets. Mathematical document editors have an intelligent editor that interprets the expressions that are in the document. The intelligent editor provided by mathematical document editors can "understand" and interpret mathematical expressions as would a human mathematician, for example, by reading and interpreting a series of expressions in a document from left to right and from top to bottom. An expression compiler of the mathematical document editor links related expressions. For example, if the user enters the expression $$x:=5 \qquad (1)$$

in a document on a screen and then enters the expressions $$y:=x-1 \qquad (2)$$

$$2*y= \qquad (3a)$$

the system would automatically display the result for expression (3a), i.e., "8". Expression (3a) would be shown in the document as $$2*y=8 \qquad (3b)$$

To arrive at this result, the mathematical document editor would determine that expression (3a) needs the value of y, which is calculated at expression (2), which in turn needs the value of x, calculated at expression (1). Accordingly, the system, in particular, the expression compiler, understands the mathematical relationships between expressions (1) to (3). The mathematical document editor will reach the same result regardless of the order in which expressions (1) to (3a) are entered by the user. What is important is the positioning of the expressions in the document. As stated above, expressions are interpreted by a human from left to right and from top to bottom within a document. Thus, expressions (1) to (3a) can be positioned logically in the document (with text between the expressions if necessary). For example, expression (1) may be placed in the top left corner of the document, expression (2) may be immediately to the right, and expression (3a) may be in the bottom center.

It is known in existing mathematical document editors to provide "live" document capabilities. When a change is made to a variable or an expression in a live document, all related expressions are also updated, in real-time. For example, if the user edits equation (1) above, using graphical user interface techniques, so that expression (1) now reads $$x:=4 \qquad (1)$$

then expressions (2) and (3b) are automatically recalculated in real-time, and a new result for expression (3) is automatically displayed in the document, i.e, $$2*y=6 \qquad (3c)$$

A document that allows for automatic recalculation of related mathematical expressions in a document whenever an expression is edited, modified, added, deleted or changed is known as a live document. The computerized system that provides live document features for mathematical document editors can be called a live mathematical document editor. The Maple symbolic engine and the Mathematica program, mentioned above, do not have "live" document capabilities, and can not be regarded as live mathematical document editors.

A system illustrative of a current live mathematical document editor is the Mathcad system, version 3.1 for Windows, by MathSoft, Inc., of Cambridge, Mass., released in 1991.

It is noted for clarity that the expression reference numbers, e.g., "(1)" need not be displayed in the live document and are included in this patent application for ease of reference to expressions. In a live document, the computer system "knows" the relationship between related equations. (A user could enter such reference numbers in a live document as text, but this would not effect the operation of the intelligent editor or expression compiler when evaluating expressions.)

As stated above, a user reads the expressions in a live document as the user would read expressions written on a white board or a sheet of paper. A user can write expressions in the live document in formats and position that are familiar to mathematician and engineers. Live documents can be edited in a similar fashion to how one would edit a document using a word processor. For example, when a user updates an expression, the user can, for example, place the cursor on the part of the expression that the user wishes to update, and add and delete variables, values, etc. in the expression. Live documents, and editing thereof, are explained in detail in the Mathcad 3.1 User's Guide Windows Version, published by Mathsoft, Inc. of Cambridge, Mass., which is expressly incorporated herein by reference.

It is known in live mathematical document editors to include a symbolic algebra engine ("SAE"), also known as a symbolic processor. (The Maple symbolic engine can be regarded as an SAE.) An SAE allows a user to undertake symbolic manipulation and/or calculation of expressions. There is a difference between a function that performs numerical evaluation and manipulation of an expression or series of expressions, and a function that performs symbolic calculation or manipulation of an expression or series of expressions. An example of a function that performs symbolic manipulation of an expression is the "expand" function. (Other symbolic calculations that can be performed on equations include solving an equation for a variable, integrating a function, simplifying an expression, factoring an expression and the like.) For example, given the expression $$(a+b).(a+b) \quad (4)$$

one could expand this expression, and arrive at the mathematically equivalent expression $$a^2+2.a.b+b^2 \quad (4a)$$

However, one could not numerically evaluate expression (4) unless given the values for variables a and b.

Although live mathematical document editors include an SAE for symbolic manipulations and calculations, such symbolic calculations are not "live" calculations (even though the system can perform live numerical calculations.) For example, suppose the user enters onto the live document the expression $$(x+1)^3 \quad (8)$$

The user may give a numerical value for x, for example, by entering the expression $$x:=2 \quad (7)$$

above or to the left of expression (8). If numerical calculation was required, expression (8) would read in a live document as follows $$(x+1)^3=27 \quad (9a)$$

If the user modified expression (7), so that x now had the value of "1" then expression (9a) would be automatically recalculated to read $$(x+1)^3=8 \quad (9b)$$

Alternatively, if x was given a value of "y+z" in expression (7), it would be impossible to numerically evaluate expression (8), and in a live document, no resultant would be displayed. The above are examples of the live numerical calculation features of live mathematical document editors. However, in present live mathematical document editors, if the user wished to evaluate expression (8) symbolically, for example, to expand expression (8), the SAE would calculate the answer, and display it in the document as follows:

$$x^3+3x^2+3x+1 \quad (10)$$

This, however, is not a live symbolic calculation. In existing live mathematical document editors, expressions are passed to the SAE, are processed by the SAE, and the results are returned for display on the document. Thus, expression (10) would be displayed underneath expression (8). However, if an expression on which a symbolic function has taken place is modified, then the result of the symbolic function performed on that expression is not modified. Thus, in the above example, if expression (8) is changed to read $$(x+1)^4 \quad (8a)$$

then expression (10), the result of the expansion, is not changed. A user must re-select expression (8/8a), reactivate the SAE, and request that the SAE expand expression (8/8a) again. In the document, the new expansion will be displayed under expression (8a), along with previous expansion, i.e., expression (10) above. That is, the previous expansion of equation (8), i.e., equation (10), will still be displayed in the document as shown above, unchanged. Thus, if an expression on which a subsequent symbolic calculation relies or depends is changed, the result of the symbolic computation does not change. Accordingly, a user viewing the updated document would see an incorrect symbolic computation. That is, symbolic calculations are not live.

As another example, if the live document included expression (4) above, and the user requested that expression (4) be expanded, the result would be expression (5) above. Suppose the user then modified the live document by adding an expression "a:=c+1" above expression (4) in the document. The correct result of the expansion of expression (4) is now $$c^2+2.c+2.c.b+1+2.b+b^2$$

but this would not be displayed. The old, incorrect result of the expansion of expression (4) would be shown, and, in existing live document editors, even if the user re-requested the expansion of expression (4), expression (5) would still be returned because the SAE is unaware that "a" now has the value "c+1". Moreover, old expression (5) would still be displayed.

Thus, existing systems that have live document capabilities do not enable sophisticated symbolic manipulation of equations where relevant and needed information to the symbolic manipulation is contained in other related equations. For example, suppose the user enters the expressions $$n:=2 \quad (5)$$

$$(y^n-1) \quad (6)$$

and then the user requests that the SAE factorize expression (6). The SAE of existing live mathematical document editors will not be able to do so—the SAE does not know that n was given a value in expression (5). As another example, the SAE does not know, when expanding expression (8), that x was defined in expression (7), and no change results to expression (10) when expression (7) is modified. Accordingly, existing systems do not allow the "live" document features to be used when performing symbolic manipulation of equations.

The process of symbolic evaluation takes place in a live mathematical document editor as follows. The user selects an expression and activates the SAE, for example, by selecting an "evaluate symbolically" command from a "Symbolic" menu of commands. The selected expression is passed to the SAE, as if the selected expression has been cut from the document, and evaluated out of the context from which the selected expression was taken. The result of the symbolic evaluation is returned by the SAE, for display immediately underneath the selected equation. Thus, present live mathematical document editors do not perform "live" document functions on symbolic equations.

In existing live document systems, the SAE is separate from the editor that allows entry of equations and the expression compiler that creates linkages between related expressions. Accordingly, the SAEs of existing live document systems can merely take expressions out of the document in use (and accordingly, out of the context in which the expression is placed), perform the symbolic manipulation, and return the result to the document. There are no dynamic links between an expression and the result of the symbolic manipulation of the expression—when an expression is modified, added or deleted, any expressions that require symbolic manipulations that depend on the information that is modified, added or deleted are not automatically recalculated.

Accordingly, there is a need for computerized systems that can perform live symbolic calculations.

SUMMARY OF THE INVENTION

The present invention is directed to a method and apparatus for providing live symbolic manipulation of expressions and equations in a computerized mathematical document system. A live mathematical document editor is provided that performs live symbolic calculations in a live document.

In the representative embodiment, the system of the present invention is controlled by a computer processor operating under instruction of a computer program and expert system. A user can enter mathematical, statistical, engineering and symbolic expressions and equations into to system for processing. The expressions and equations can be displayed in a document on a computer screen, or other similar output device, as if the computer screen was a white board, and the expressions and equations can be manipulated using graphical user interface commands. By using a symbolic evaluation operator (in the representative embodiment of the present invention, a specially designated symbolic: equal sign "=>") as part of an equation, the user can request that the present invention perform a symbolic calculation or manipulation on the equation. The user can select various symbolic functions, such as, for example, simplify, expand, and factor.

According to the present invention, when required by a user, expressions are manipulated symbolically rather than numerically, to obtain a symbolic result of an expression. Related expressions and equations are logically linked so that the symbolic relationship between expressions and variables in an expression or equation can be taken into account in the symbolic manipulation of an expression or equation. When an expression or equation is updated or modified by the user, all equations that include the specially designated symbolic equal sign, together with all related equations to which they are linked, are automatically recalculated (i.e., symbolically manipulated again) in real-time.

Accordingly, the present invention can be regarded as a mathematical document editor, capable of placing mathematical expressions in standard mathematical form at any position on a screen representing a printed page. A dependency graph data structure is maintained by a dependency analyzer of the present invention such that the dependency-graph always reflects the mathematical dependencies explicit in the expressions in the document.

The dependency graph is created and maintained as follows: an expression (here termed the "subject expression") including or making reference to a variable where the meaning of the variable is defined or constrained in another expression which appears in the document to the left or above the subject expression is said to depend on the defining or constraining expression. An expression which appears in the document to the left or above the subject expression and defines or constrains a variable in the subject expression is termed a "defining expression." A subject expression which includes a symbolic evaluation operator or other designated instruction (as stated above, in the representative embodiment of the present invention, the symbolic evaluation operator is a specially designated symbolic equal sign "=>") is evaluated by a computer controlled symbolic algebra engine ("SAE") taking into account all definitions and constraints on which the subject expression depends, as specified or determined by the defining expression(s) identified in the dependency graph, as well as any definitions and constraints on which the defining expression(s) depends, and so on up the dependency graph. The expression which results from the symbolic evaluation by the SAE is displayed as the value (or result) of the symbolic evaluation operator.

Should the user modify any expression, introduce new expressions, or remove expressions, the dependency graph is used to determine which expressions that include the symbolic evaluation operator must now be recalculated because one or more of its antecedents has been changed. If an expression that includes the symbolic evaluation operator has an antecedent expression (e.g. a defining expression or a defining expression of a defining expression, and so on up the dependency graph) that has been introduced, removed or modified, the expression that includes the symbolic evaluation operator is recalculated by the SAE. Thus, the document is kept "up to date" in the sense that all results computed for expression with symbolic evaluation operators are in fact consistent with all the antecedent expressions upon which they depend.

Thus, the present invention provides for live symbolics in a computerized mathematical document system.

BRIEF DESCRIPTION OF THE DRAWINGS

FIG. 1 is a block diagram of exemplary hardware that can be used in conjunction with the representative embodiment of the present invention.

FIG. 2 is diagram of the structure of the modules of the present invention.

FIG. 6 is an example screen display showing use of the "assume" keyword.

FIG. 8 is an example screen display showing use of the expressions that depend on a symbolic result.

DETAILED DESCRIPTION

Figure 3A:
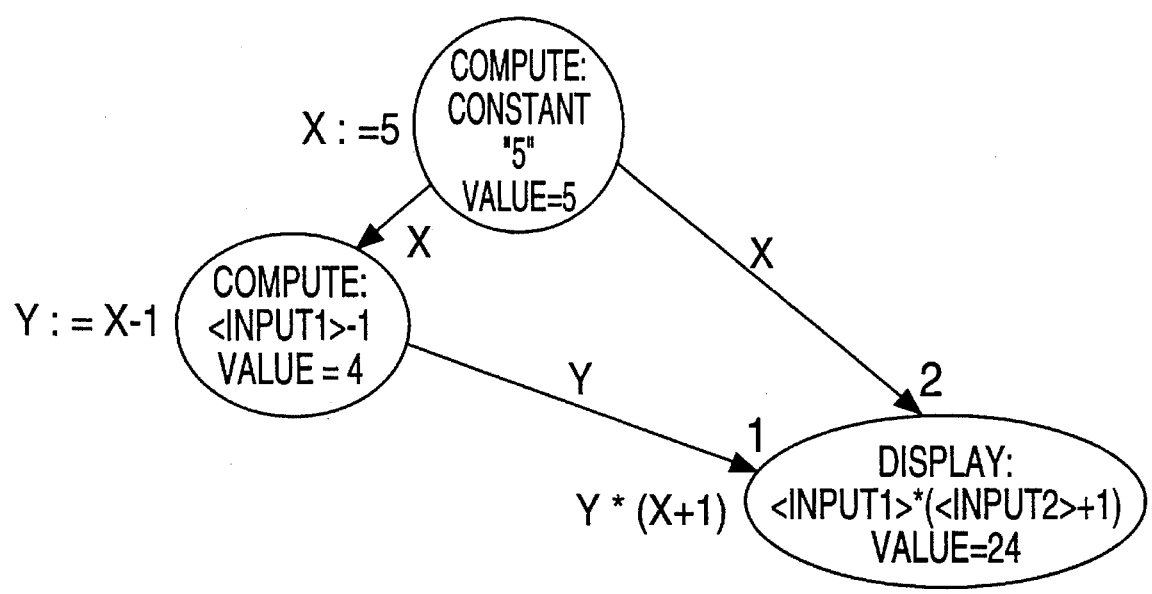
FIG. 3a is an example of a node structure of the numerical dependency graph of FIG. 2.

Referring now to the drawings, and initially FIG. 1, there is illustrated in block diagram form exemplary hardware that can be used in conjunction with the representative embodiment of the present invention. A processor 2, such as, for example, an IBM brand compatible personal computer with a 486 Intel chip, is coupled to a memory 4, such as a hard disk drive, that stores a computer program that is executed by the processor 2 to control and coordinate the apparatus and method of present invention. Data that is manipulated by the processor 2, such as, for example, electronic documents that include mathematical expressions, can be stored in the memory 4. An input device 6, such as a keyboard and a mouse, is coupled to the processor 2. A user can enter, for example, instructions and data using the input device. Input can also be received from another processor—for example, the input to the present invention can be the output of a computer program. An output device 8, typically a computer monitor or CRT, is coupled to the processor 2 for displaying output, such as, for example, the electronic document that the user is currently creating and editing.

Turning now to FIG. 2, there is illustrated in block diagram form the main components of the present invention. Typically, a user enters an expression via the input device 6 to a smart editor 10 of the present invention.

In the representative embodiment, the present invention has live numeric capabilities and live symbolic capabilities. The live numeric capabilities are controlled by an expression compiler 14 and a numerical interpreter 18, in combination with a numerical dependency graph 16 and a numerical library 20. In the representative embodiment, the live symbolic capabilities are controlled by a live symbolic interpreter 24 (that can interface with a symbolic algebra engine ("SAE") 22) in combination with a symbolic dependency graph 26. In the representative embodiment, the user can turn on and can turn off the live symbolic capabilities of the present invention.

Assuming that the live symbolics feature of the present invention is not turned on, the document 12 is "live" for numerical calculations but not symbolic calculations. The following is a description of the present invention's live numeric features, which is provided to contrast its live symbolic features. The editor 10 creates an expression based upon the user's input and places the expression in the open document 12. Typically, the expression is placed in the document 12 at the point identified by the user's cursor position. The document 12 is displayed to the user on an output device 8. (The instructions entered by the user to create and edit expressions are fully set forth in Mathcad 3.1 User's Guide Windows Version, published by Mathsoft, Inc. of Cambridge, Mass.)

The expression entered by the user is sent by the editor 10 to an expression compiler 14. The expression compiler 14 determines if this is a new expression or an update of an existing expression.

All expressions are represented by an entry in the numerical dependency graph 16. The numerical dependency graph 16 identifies the relationship between expressions in the document. In the representative embodiment of the present invention, the numerical dependency graph 16 is implemented as a linked list data structure (coded in the "C" programming language) that stores expressions and the relationship between expressions. The numerical dependency graph 16 can be thought of as a directed acyclic graph where the nodes of the graph represent expressions and the arcs of the graph represent variables that have numeric values.

If a new expression is entered by the user, the expression compiler 14 creates a new node in a numerical dependency graph 16. For example, if the expression entered was "n:=2" then the expression compiler 14 calculates, in conjunction with a numerical interpreter 18 (sometimes also called a numerical computational engine), the value of the expression (in this case, the simple calculation that n has the value 2), and creates a node in the numerical dependency graph 16, where the node has the value 2, and the arc coming from the node represents the variable "n". As another example, if the expression entered was "y:=2+3", then a node is created that represents this expression. The value of the expression is calculated as 5. Thus, the node has the value 5, and the arc coming from the node represents the variable "y". As a further example, if the expression entered was "y:=2+a" then a node is created that represents this expression. The value of the expression is calculated only if "a" has a value in an expression in the document 12 that is above or to the left of the expression "y:=2+a". If "a" is so defined, then the node has an arc coming into the node represents the variable "a". (The structure of the numerical dependency graph 16 is discussed in more detail below with reference to FIG. 3a.)

Thus, the numerical dependency graph 16 is created and maintained to represent the mathematical interrelationship between expressions in the document 12. An expression (here termed the "subject expression") including or making reference to a variable where the meaning of the variable is defined or constrained in another expression which appears in the document 12 to the left or above the subject expression is said to depend on the defining or constraining expression. An expression which appears in the document 12 to the left or above the subject expression and defines or constrains a variable in the subject expression is termed herein a "defining expression." The numerical dependency graph 16 defines all relationships between subject expressions and defining expressions that are in the live document 12 of the present invention. Thus, where the newly entered expression relies on values from other expressions, the expression compiler 14 generates a node for the new expression that depends from the nodes representing the expressions relied upon.

Accordingly, when the user enters a new expression, the expression compiler 14 looks up the numerical dependency graph 16 for other expressions that may give numerical values to variables or expressions used in the new expression. If the newly entered expression references expressions defined above or to the left of the newly entered expression, the expression compiler 14 imports into the node for the new expression those values from the node(s) in the numerical dependency graph 16 and the numerical interpreter 18 calculates (as best as possible) the value for the new expression. The numerical interpreter 18 causes the value for the new expression to be placed in the document 12.

When the user modifies (or deletes) an expression that has been previously entered, the editor 10 modifies the expression and places the modified expression in the correct location in the document 12. The expression compiler 14 generates a new value of the modified expression. Next, the expression compiler 14 automatically examines the numerical dependency graph and marks as "out of date" all expressions that depend on the modified expression. Next, each node that has been marked out of date in turn recalculates itself (with the assistance of the numerical interpreter 18). In performing each recalculation, the node looks up the numerical dependency graph 16 to find the new values of any recalculated nodes (i.e., expressions). When a node is recalculated, the numerical interpreter 18 automatically updates the document 12. Accordingly, the document 12 is always the most current representation of the nodes of the numerical dependency graph 16. Thus, all expressions in the document 12 are in fact consistent with all antecedent expressions upon which they depend.

The numerical interpreter 18 has access to the numerical library 20 that is a library of subroutines for performing numerical computations.

In further detail, when an expression is entered by a user that requires calculation, the expression compiler 14 generates a "program" that determines how the expression is to be calculated to give a result. (An example of a program is the "compute" program is shown in a node in FIG. 3a.) Where variables in the expression have been previously calculated, reference is made to these expressions. The numerical interpreter 18 executes such programs to evaluate expressions. The programs can be regarded as the contents of the nodes, as shown in FIG. 3a. If the user enters a numeric evaluation operator (for example, in the representative embodiment, an equal sign (i.e. "=")) after an expression, then the expression compiler 14 generates a display "function" that specifies that the result of the expression is to be displayed alongside the expression on the document 12. These programs and functions can be stored in the numerical dependency graph 16. When any expression is modified, the expression compiler 14 will re-generate a new program for that expression, have the numerical interpreter 18 recalculate the result of the expression, and mark and have updated all expressions that reference the modified expression. For expressions that are updated because they depend upon changed expressions in the numerical dependency graph 16, the program for the expression is executed. Thus, to be precise, it is programs representing expressions (not expressions) that are generated, re-generated and executed.

In the representative embodiment of the present invention, the editor 10, expression compiler 14, numerical dependency graph 16 and numerical interpreter 18 are implemented in the "C" programming language.

Coupled to the editor 10 of the present invention, and operating independently from the expression compiler 14, is a symbolic algebra engine ("SAE") 22. In the representative embodiment of the present invention, the SAE 22 is a version of the Maple symbolic engine developed by Waterloo Maple Software, Inc. of Ontario, Canada.

In the representative embodiment, the editor 10 can interface directly with the SAE 22. This interaction allows a user to perform non-live symbolic operations. To operate the non-live symbolic features, the user can mark an expression in the document 12, for example, by placing the cursor on the expression and clicking a button on the mouse 6. The user can then turn on the SAE, and enter a symbolic command. Examples of symbolic commands include EVALUATE SYMBOLICALLY, SIMPLIFY, EXPAND EXPRESSION, FACTOR EXPRESSION, SOLVE FOR VARIABLE, INTEGRATE ON VARIABLE, DIFFERENTIATE ON VARIABLE, CONVERT TO PARTIAL FRACTION, TRANSPOSE MATRIX, INVERT MATRIX, DETERMINATE OF MATRIX. The editor 10 takes the expression selected by the user, passes it to the SAE 22, which performs the requested symbolic command. The result is returned to the editor 10 for insertion into the document 12. However, the SAE 22 cannot perform live symbolic calculations. As explained above, expressions passed to the SAE 22 directly by the editor 10 are taken out of the context from the live document from which the expressions comes. The SAE 22 is independent from the expression compiler 14. An expression returned to editor 10 by the SAE 22 and inserted in the document 12 is not automatically updated when the expression that was selected by the user and was passed to the SAE 22 is later modified.

The live symbolics feature of the present invention is implemented by means of the symbolic dependency graph ("SDG") 26 and the live symbolic interpreter 24. The user must activate the live symbolics feature of the present invention by entering a command to do so. (In the representative embodiment of the present invention, the user activates live symbolics by selecting a designated icon.) Once the live symbolics feature is activated, each expression that is entered by the user is passed by the editor 10 to both the expression compiler 14 (for numerical calculations and entry in the numerical dependency graph 16) and to the SDG 26 (for symbolic processing).

Conceptually, the structure of the SDG 26 is a directed acyclic graph, comprising nodes and arcs. Each node represents an expression, as an expression. There is no substitution of values for variables. Each expression is treated as an symbolic expression, not a numerical expression. Where dependencies exist between expressions, this is reflected in the structure of the SDG 26. The meaning given to the nodes of the SDG 26, and the implementation of the SDG 26 is significantly different to that of the numerical dependency graph 16.

In the SDG 26, an expression (here termed the "subject expression") including or making reference to a variable where the meaning of the variable is defined or constrained in another expression which appears in the document to the left or above the subject expression is said to depend on the defining or constraining expression. An expression which appears in the document 12 to the left or above the subject expression and defines or constrains a variable in the subject expression is termed a "defining expression." A subject expression which includes a symbolic evaluation operator or other designated instruction is evaluated by the SAE 22 taking into account all definitions and constraints on which the subject expression depends, as specified or determined by the defining expression(s) identified in the SDG 26, as well as any definitions and constraints on which the defining expression(s) depends, and so on up the SDG 26. The expression which results from the symbolic evaluation is displayed as the value (or result) of the symbolic evaluation operator.

Should the user modify any expression, introduce new expressions, or remove expressions, the SDG 26 is used to determine which expressions that include the symbolic evaluation operator must now be recalculated because one or more of its antecedents has been changed. If an expression that includes the symbolic evaluation operator has an antecedent expression (e.g. a defining expression or a defining expression of a defining expression, and so on up the SDG 26) that has been introduced, removed or modified, the expression that includes the symbolic evaluation operator is recalculated by the SAE 22. Thus, the document is kept "up to date" in the sense that all results computed for expression with symbolic evaluation operators are in fact consistent with all the antecedent expressions upon which they depend.

Each expression that has a symbolic evaluation operator (or is otherwise designated by the user as requiring a symbolic calculation) is symbolically evaluated when first entered and when an antecedent expression in the SDG 26 is added, modified, or deleted. An expression is symbolically evaluated as follows. The expression that has the symbolic evaluation operator and all expressions that are antecedent in the SDG 26 that define or constrain, directly or indirectly, a variable in the expression with the symbolic evaluation operator are bundled together as a package, and are passed to the SAE 22 for evaluation. (In the representative embodiment, the live symbolic interpreter 24 will take the expression that has the symbolic evaluation operator and all expressions that are antecedent in the SDG 26 that define or constrain, directly or indirectly, a variable in that expression and pass them as a package to the SAE 22 for processing.) The resultant expression is returned to the live symbolic interpreter 24. The SDG 26 can be updated by adding the returned expression to the SDG 26. The returned expression is added to the document 12.

Thus, each time an expression in the SDG 26 is modified, updated, added or deleted, the live symbolic interpreter 24 determines if any expression that has a symbolic evaluation operator and relies upon the modified/updated expression is affected.

In contrast to the numerical dependency graph 16, where the nodes represent programs that calculate numerical values for entered expressions and where the arcs are variable names that represent the corresponding numerical variables, the nodes of the SDG 26 represent expressions qua expressions and the arcs represent variable names that represent the corresponding expressions. For example, if the user enters the following expressions:

$$x:=5; \qquad (11)$$

$$y:=x-1; \qquad (12)$$

and then entered the expression $$(x+1).y= \qquad (13)$$

(the "=" sign in the representative embodiment of the present invention signifying that this is to be evaluated as a numerical expression) then the numerical dependency graph 16 of FIG. 3a would be produced. The result, the number "24" would be displayed at expression (13) as follows:

$$(x+1).y=24 \qquad (13a)$$

However, if the user enters the expression $$(x+1).y-> \qquad (14)$$

Figure 3B:
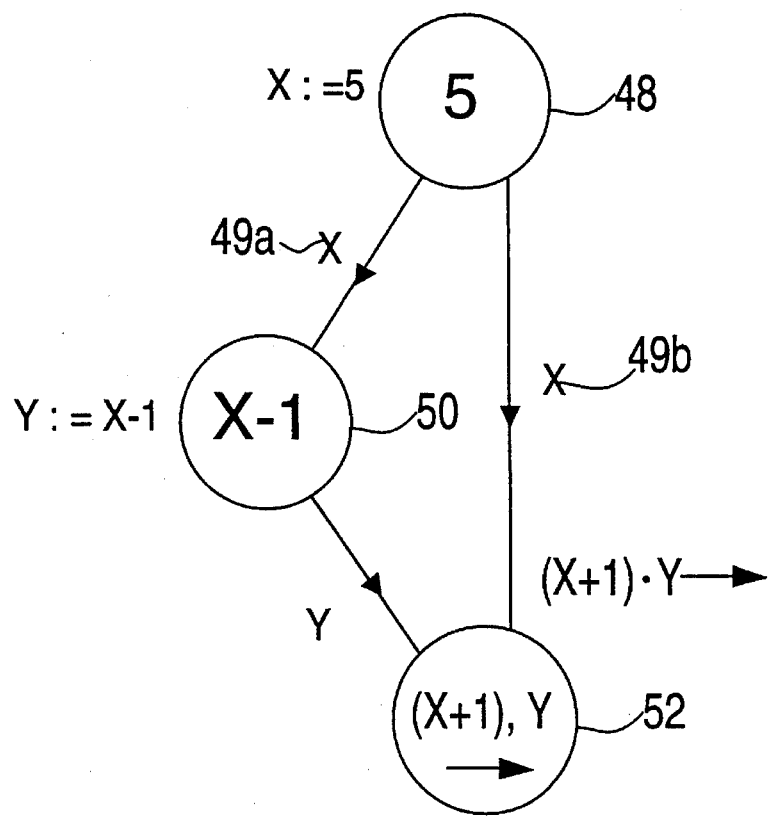
FIG. 3b is an example of a node structure of the symbolic dependency graph of FIG. 2.

(the "->" sign signifying that the expression is to be evaluated symbolically), then the SDG 26 of FIG. 3b would also be produced, and the evaluation would result in $$(x+1).y->24 \qquad (14a)$$

It is noted that it is not the order that the expressions are entered by the user that determines the hierarchy of graphs, but rather, the mathematical meaning as to where the expressions are placed in the document 12.

Suppose the expression "y:=x-1" (represented by node 50 in FIG. 3b) is edited by the user to read "y:=x+c". Node 50 would not be re-calculated. However, because node 52 includes a symbolic evaluation operator, the expression at node 52 requires re-calculation. Expression (14), along with expressions (11) and (12), would be passed to the SAE 22 in the correct order for processing. The result would be displayed as follows:

$$(x+1).y->30+6.c \qquad (14c)$$

As another example, suppose the expression "y:=x+c" was changed to "y:=3x". Expressions (13) and (14) would change to $$(x+1).y=90 \qquad (13b)$$

$$(x+1).y->90 \qquad (14d).$$

In FIG. 3b, the only expression that is re-calculated in the SDG 26 is the expression represented by node 52, as explained above. However, for the numerical dependency graph 16 in FIG. 3a, the node representing the expression "y:=x-1" would change, causing a new program (i.e., a "compute" program") to be generated at that node. Thus, for this one change, expressions represented by two nodes would change, viz., a "compute" program at the node representing the expression "y:=3x" would be generated and executed, and the display function would be regenerated and executed.

It is further noted that the arcs in FIG. 3b pass expressions, not numerical results. According, arcs 49a and 49b pass the expression "5" not the numerical value 5.

In the representative embodiment of the present invention, the SDG 26 and the live symbolic interpreter 24 are implemented using the expert system shell known as CLIPS (C Language Integrated Production Systems), developed by NASA's Artificial Intelligence Section. CLIPS acts like a separate and independent processor. The live symbolic interpreter 24 is implemented as a set of expert system rules. These expert system rules are written as CLIPS rules, and are set forth in Appendix A attached hereto and are expressly incorporated herein. The symbolic expressions in the SDG 26 are represented as facts (or tokens) that can be processed by the rules of the live symbolic interpreter 24. Thus, the implementation of the data structure of the SDG 26 of the representative embodiment is a set of facts written in CLIPS notation. An example of a fact may be (NODE AT 527 607234)

(607234 defs "x")

which states that the node for expression "x" is at line 527, having a generated identification number of 607234. This notion is easily understood by those familiar with the CLIPS notation. CLIPS is a public domain program.

Accordingly, when an expression is entered by the user, the editor 10 places the expression in the SDG 22 in the form of a complex CLIPS fact. The editor 10 includes code programmed in the C programming language to perform this function. If the expression includes a "->" sign, the live symbolic interpreter 24 causes a symbolic evaluation of the expression to be performed. In doing so, the live symbolic interpreter 24 examines the SDG 22 to determine on what expressions the subject expression depends, directly or indirectly. For example, if the subject expression is "x=y–>" then the rules of the live symbolic interpreter 24 determines, utilizing the facts of the SDG 22, what are the symbolic values of "x" and of "y". The live symbolic interpreter 24 takes the symbolic definitions of x and y and the subject expression, a passes them to the SAE 22 for evaluation. The resultant expression is displayed as an expression.

Of course, the dependencies of expressions can be very complex, and the general principals discussed above are able to take into account the complexity of mathematics.

Examples of symbolic operations that can be performed using the live symbolics feature of the representative embodiment of the present invention include EVALUATE SYMBOLICALLY, SIMPLIFY, EXPAND EXPRESSION, FACTOR EXPRESSION, SOLVE FOR VARIABLE, INTEGRATE ON VARIABLE, DIFFERENTIATE ON VARIABLE, CONVERT TO PARTIAL FRACTION, TRANSPOSE MATRIX, INVERT MATRIX, DETERMINATE OF MATRIX.

Figure 4:
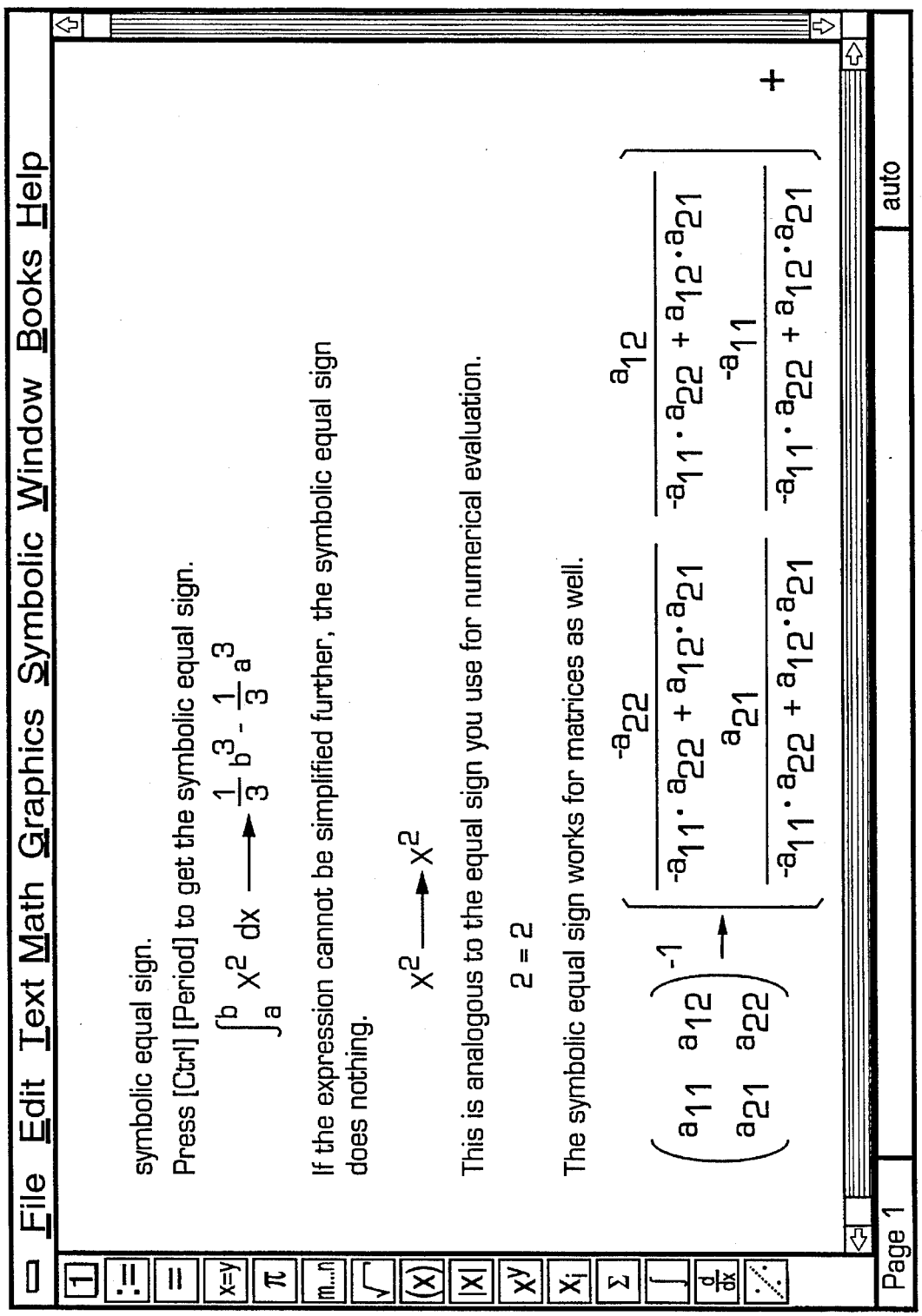
FIG. 4 is an example screen display showing use of the symbolic evaluation operator of the representative embodiment of the present invention.

Turning now to FIG. 4, there is illustrated a screen display of an example document 12 generated by the present invention. In the representative embodiment, the document 12 is displayed on a computer screen to represent a white board. Both expressions and text can be included in the document 12. Parts of the document 12 that comprise expressions are known as "math regions." Here, the text is included for explanatory purposes. As is known in the art, a menu bar is included at the top of the window that contains the document 12.

FIG. 4 shows examples of how, in the representative embodiment, a user may use "–>" as the symbolic evaluation operator, which, in the representative embodiment, is entered by the user by pressing the "control" key and the "period" key. The "–>" operator applies to the whole of the expression of its left hand side, and the result of the symbolic manipulation is on the right hand side. FIG. 4 shows that the symbolic evaluation operator can be used for matrices and integrals.

Figure 5:
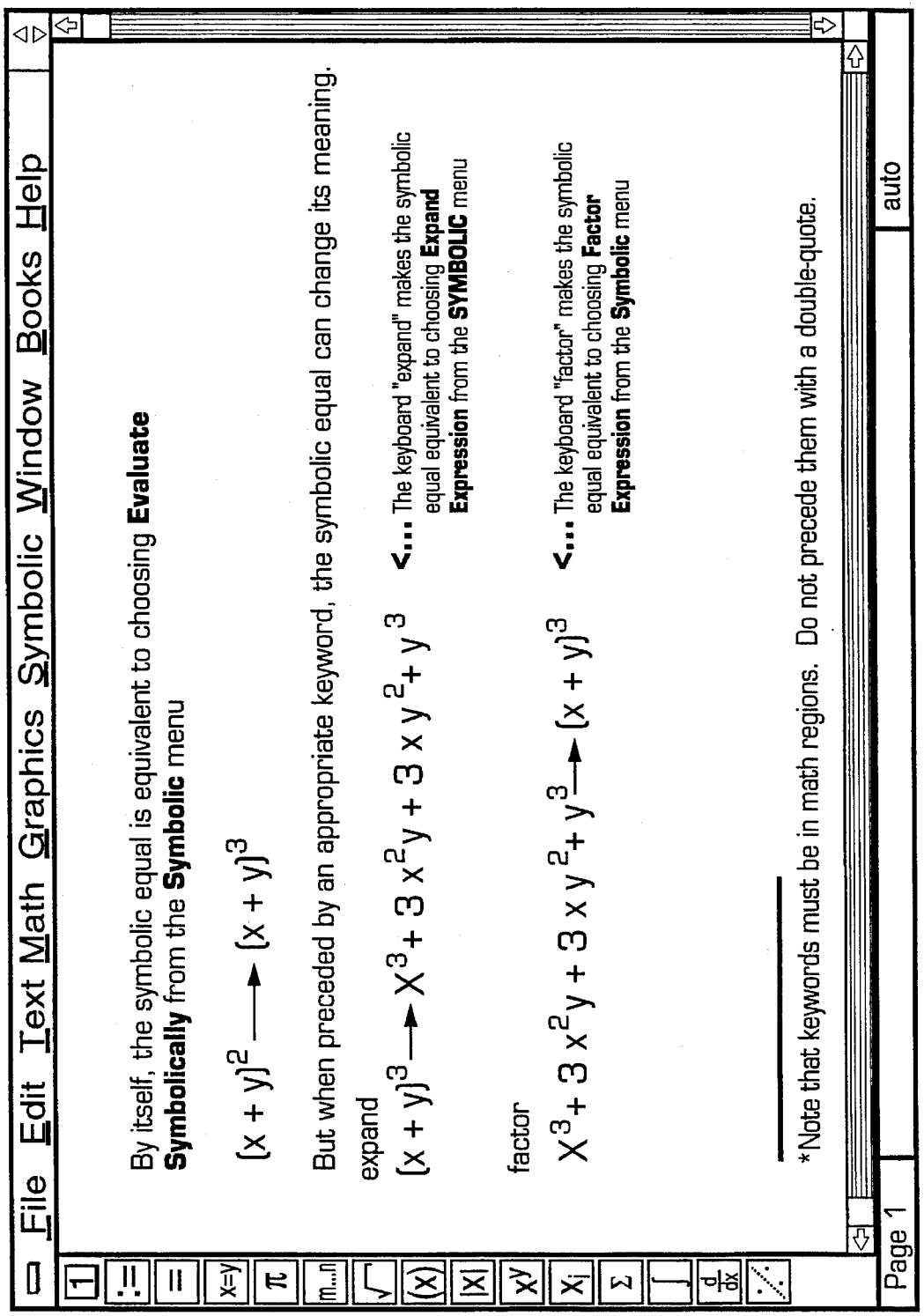
FIG. 5 is an example screen display showing use of keywords to vary the significance of the symbolic evaluation operator.

FIG. 5 is another example of a screen display, showing the use of keywords. Keywords modify the operation of the "–>" operator. When the symbolic evaluation operator is used by itself, the symbolic evaluation operator performs an "Evaluate Symbolically" operation. However, the function performed by the symbolic evaluation operator can be varied by preceding the expression with the symbolic evaluation operator with a keyword. In the representative embodiment, there are five keywords, namely, "simplify", "expand", "factor", "assume", and "complex".

The keyword "simplify" simplifies the expression, performing arithmetic, canceling common factors and using basic trigonometric and inverse function identifies. The keyword "expand" expands all powers and products of sums in the selected expression. The keyword "factor" factors the selected expression into a product, if the entire expression can be written as a product. The keyword "assume" causes the present invention to treat the variable which follows as a variable even though it may have numerical values assigned to it. It can also be used to specify constraints to be used in evaluation of the expression. The keyword "complex" causes the present invention to carry out symbolic evaluation in the complex domain. The result will usually be in the form a+i.b.

Figure 7:
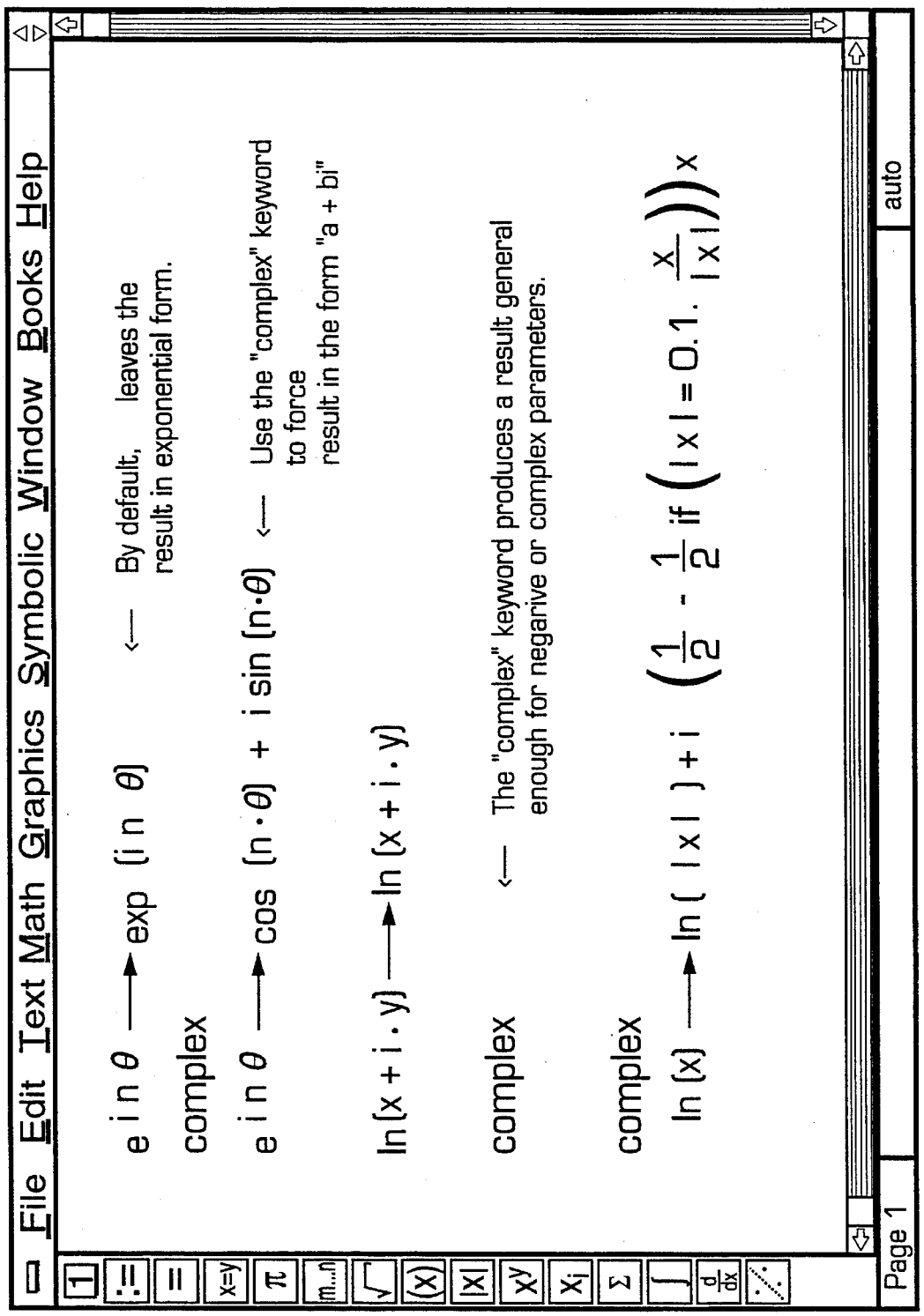
FIG. 7 is an example screen display showing use of the "complex" keyword.

It is noted that in the representative embodiment that keywords can be entered directly on a document 12, as if writing on a white board, or can be selected from a "Symbolic" menu on the menu bar of the graphical user interface of the present invention. FIG. 6 shows use of the "Assume" keyword. FIG. 7 shows use of the "complex" keyword.

FIG. 8 illustrates creating expressions that depend upon a symbolic result. By using the symbolic equals sign in definitions, the user can create other definitions that depend on a symbolic result. The additional definitions will change whenever the symbolic result changes. Thus, the changing of a function definition changes the result of all expressions that use that function.

As an example, suppose the user enters the expression $$x.(a-c)\rightarrow \tag{15}$$

the result $$x.(a-c)\rightarrow x.(a-c) \tag{15}$$

would be displayed. If the user then entered, above expression (15) in the document the keyword "expand", then expression (15) would be automatically modified by the system of the present invention to read as follows $$x.(a-c)\rightarrow x.a-x.c \tag{15}$$

If the user then entered above the word "expand" the expression $$x:=a+c \tag{16}$$

then expression (15) would be automatically modified by the system of the present invention to read as follows:

$$x.(a-c)\rightarrow a^2-c^2 \tag{15}$$

If the word expand was deleted, then expression (15) would be automatically modified by the system of the present invention to read as follows:

$$x.(a-c)\rightarrow (a+c).(a-c) \tag{15}$$

If the user re-entered the keyword "expand" above expression (15) and entered the expression $$a:=4 \tag{17}$$

to the left of expression (16), then the only change that would occur on the screen would be that expression (15) would be automatically modified by the system of the present invention to read as follows:

$$x.(a-c)\rightarrow 16-c^2 \tag{15}$$

If the user then modified expression (15) by replacing the variable "c" on the left hand side with the integer "1", then expression (15) would be automatically modified by the system of the present invention to read as follows:

$$x.(a-1)\rightarrow 12+3.c \tag{15}$$

The above example is given for illustration only, and does not limit the wide range of symbolic manipulations that can be performed by the present invention. The use to which the present invention can be placed is limited only by the imagination of the user.

An embodiment of the present invention can use expert system technology to decide how to tackle a mathematical problem at a higher level. Without such capabilities, prior systems interpreted every expression literally, plugging in numbers and dutifully performing each operation. With the expert system of the present invention, a comprehensive set of mathematical rules becomes available. These rules make it possible for the present invention to determine how best to combine its symbolic and numeric capabilities. In the representative embodiment, the expert system rules are implemented using the CLIPS shell, which can reside in the symbolic interpreter 24. The present invention enables rules to be added to the expert system, for example, by users.

The present invention can be used in combination with electronic books. An example of an electronic book is Mathcad's Treasury of Methods and Formula, published by Mathsoft, Inc. An electronic book can be regarded as a document 12 with hyperlinks, a searchable index, and a table of contents. An electronic book can be displayed on the output device 8. For example, by selecting an entry in the table of contents of an electronic book, the contents of that section of the electronic book is displayed. An electronic book according to the present invention can include text and mathematical formulas. After loading the electronic book, for example, from disk into memory 4, for use in conjunction with the present invention, the user has the ability to move through the book easily. Moreover, the user can "edit" the electronic book. Thus, the user can edit expressions that appear in the book. These expressions may include expressions with the symbolic evaluation operator. Where the user edits the book, for example, by changing an expression, the techniques of the present invention are used to determine if any expressions in the electronic book comprising a symbolic evaluation operator need to be re-evaluated.

What is claimed is:

1. For use in an editable electronic book having hyperlinks and a table of contents with hyperlinks to corresponding sections of the electronic book, the electronic book including a first expression symbolically defining a first variable and a second expression including at least a symbolic evaluation operator and the first variable, a computer-based method for modifying symbolic expressions in real-time in the electronic book, the method comprising the steps of:

displaying the electronic book on a screen of a computer such that the first expression is displayed in the electronic book and the second expression is displayed at a position in the electronic book below or to the right of the first expression;

maintaining a data structure representing mathematical dependencies between expressions explicit in the expressions of the electronic book, the data structure including an acyclic directed graph including a first node representing the first expression and a second node representing the second expression;

performing a predetermined symbolic function on the second expression to produce a first resultant expression, the first resultant expression being mathematically equivalent to the second expression in combination with the first expression;

displaying the first resultant expression in the electronic book;

accepting as input from the user an instruction to modify the first expression in the electronic book;

displaying the modified first expression in the electronic book;

examining the data structure to determine all expressions that reference the first variable;

automatically and without further user intervention, passing the second expression as symbolic data and the modified first expression as symbolic data to the symbolic algebra engine;

at the symbolic algebra engine, automatically and without further user intervention, performing the predetermined symbolic function on the second expression to produce a modified resultant expression, the modified resultant expression being mathematically equivalent to the second expression in combination with the modified first expression;

adding the modified resultant expression to the data structure; and displaying the modified resultant expression in the electronic book in place of the resultant expression.

2. A computer-based real-time method for modifying symbolic expressions in an editable electronic book displayed on a screen of a computer, the electronic book including a searchable index and a table of contents with hyperlinks to corresponding sections of the electronic book, the method comprising the steps of:

displaying at least two expressions at any position on the electronic book, each one of the at least two expressions symbolically defining a variable;

maintaining a dependency-graph data structure representing mathematical dependencies between expressions explicit in the at least two expressions of the electronic book;

accepting as input from the user an instruction to modify one of the at least two expressions in the electronic book;

displaying the modified expression in the electronic book;

examining the dependency-graph data structure to determine all expressions that reference the variable symbolically defined in the modified expression;

if an expression that references the modified expression includes a symbolic evaluation operator, passing the referenced expression, the modified expression and all other expressions that reference the referenced expression as symbolic data to a symbolic algebra engine;

at the symbolic algebra engine, automatically performing a predetermined symbolic function on the referenced expression to produce a resultant expression, the resultant expression being mathematically equivalent to the referenced expression, the modified expression and all other expressions that reference the referenced expression;

adding the resultant expression to the data structure; and displaying the resultant expression in the electronic book.

3. An electronic mathematical book editor for performing live symbolic mathematical operations, said electronic mathematical book editor controlled by a computer having a screen capable of displaying an electronic mathematical book, the mathematical book editor comprising:

editor means for placing mathematical expressions in standard mathematical form in the electronic mathematical book, a subset of the mathematical expressions comprising a symbolic evaluation operator;

said editor means including means for modifying mathematical expressions in the electronic mathematical book;

dependency analyzer means for maintaining a dependency-graph data structure so that the dependency-graph data structure continuously represents mathematical dependencies between the mathematical expressions in the electronic mathematical book;

symbolic algebra means for symbolically evaluating each mathematical expression in the electronic mathematical book that includes the symbolic evaluation operator by utilizing the dependency-graph data structure to take into account all mathematical expressions on which the mathematical expression that includes the symbolic evaluation operator directly and indirectly depends;

means for displaying in the electronic mathematical book results of the symbolic evaluation of each mathematical expression produced by said symbolic algebra means;

means for automatically updating the electronic mathematical book whenever a mathematical expression is modified by utilizing said symbolic algebra means and the dependency-graph data structure to take into account all mathematical dependencies in the electronic mathematical book so that all mathematical expressions comprising the symbolic evaluation operator are consistent with all antecedent mathematical expressions upon which said mathematical expressions depend.

4. The electronic mathematical book editor of claim 3 wherein said dependency analyzer means includes means for determining, for a given mathematical expression, all antecedent mathematical expressions upon which said mathematical expression depends.

5. The electronic mathematical book editor of claim 4 wherein all antecedent mathematical expressions upon which a mathematical expression depends include only mathematical expressions located above or to the left of said mathematical expression in the electronic mathematical book.

6. The electronic mathematical book editor of claim 3 further comprising expression compiler means for maintaining a numerical dependency graph and for calculating the numerical value of mathematical expressions.

7. A computer-implemented apparatus for modifying, in real-time, symbolic expressions in an electronic document displayed on a screen of a computer, the apparatus comprising:

means for displaying at least two expressions at any position on the electronic document, each one of the at least two expressions symbolically defining a variable;

means for maintaining a dependency-graph data structure representing mathematical dependencies between expressions explicit in the at least two expressions of the electronic document;

means for accepting as input from the user an instruction to modify one of the at least two expressions in the electronic document;

means for displaying the modified expression in the electronic document;

means for examining the dependency-graph data structure to determine all expressions that reference the variable symbolically defined in the modified expression;

means for determining if an expression that references the modified expression includes a symbolic evaluation operator and for then passing the referenced expression, the modified expression and all other expressions that reference the referenced expression as symbolic data to a symbolic algebra engine;

a symbolic algebra engine including means for automatically performing a predetermined symbolic function on the referenced expression to produce a resultant expression, the resultant expression being mathematically equivalent to the referenced expression, the modified expression and all other expressions that reference the referenced expression;

means for adding the resultant expression to the data structure; and means for displaying the resultant expression on the electronic document.

8. The apparatus of claim 7 wherein the electronic document is an electronic book.

9. The apparatus of claim 8 wherein said electronic book further comprises a searchable index and a table of contents, each including hyperlinks to referenced sections of the electronic book.

10. A computer-implemented apparatus for performing live symbolic mathematical operations in a mathematical document editor, said mathematical document editor capable of editing and processing a mathematical document, the apparatus comprising:

an output device for displaying the mathematical document;

means for placing mathematical expressions in standard mathematical form in the mathematical document, a subset of the mathematical expressions comprising a symbolic evaluation operator;

means for maintaining a dependency graph so that the dependency graph continuously represents mathematical dependencies between the mathematical expressions in the mathematical document;

means for symbolically evaluating each mathematical expression in the mathematical document that includes the symbolic evaluation operator, said step of symbolically evaluating including the sub-step of utilizing the dependency graph to ascertain all mathematical expressions on which the mathematical expression that includes the symbolic evaluation operator directly and indirectly depends;

means for displaying in the mathematical document results of the symbolic evaluation of each mathematical expression evaluated at the previous step;

means for editing one or more mathematical expressions in the mathematical document; and means for automatically updating the mathematical document whenever a mathematical expression is edited by utilizing the dependency graph to take into account all mathematical dependencies in the mathematical document so that all mathematical expressions comprising the symbolic evaluation operator are consistent with all antecedent mathematical expressions upon which said mathematical expressions depend.

11. The apparatus of claim 10 wherein the electronic document is an electronic book.

12. The apparatus of claim 11 wherein said electronic book further comprises a searchable index and a table of contents, each including hyperlinks to referenced sections of the electronic book.

13. The apparatus of claim 10 further comprising means for determining, for a given mathematical expression, all antecedent mathematical expressions upon which said mathematical expression depends.

14. The apparatus of claim 13 wherein all antecedent mathematical expressions upon which a mathematical expression depends include only mathematical expressions located above or to the left of said mathematical expression in the mathematical document.

15. The apparatus of claim 14 wherein the dependency graph is a directed acyclic graph.

16. The apparatus of claim 15 wherein the directed acyclic graph comprises a plurality of nodes, each node representing one expression in the mathematical document.

17. The apparatus of claim 16 wherein the electronic document is an electronic book comprising a searchable index and a table of contents, the search index and table of contents each including hyperlinks to referenced sections of the electronic book.

18. A computer-implemented mathematical electronic book editor for performing live symbolic and live numeric mathematical operations in an electronic book, the electronic book including a searchable index and a table of contents, the search index and table of contents each including hyperlinks to referenced sections of the electronic book, the mathematical electronic book editor comprising:

means for placing mathematical expressions in standard mathematical form in the electronic book, a subset of the mathematical expressions comprising a symbolic evaluation operator;

means for maintaining a symbolic dependency graph that continuously represents mathematical symbolic dependencies between the mathematical expressions in the electronic book, the symbolic dependency graph including a plurality of nodes, each node representing a symbolic expression of a mathematical expression;

means for maintaining a numeric dependency graph that continuously represents mathematical numerical dependencies between the mathematical expressions in the electronic book, the numeric dependency graph including a plurality of nodes, each node representing a numeric value of a mathematical expression;

means for symbolically evaluating each mathematical expression in the electronic book that includes the symbolic evaluation operator;

means for displaying in the electronic book results of the symbolic evaluation of each mathematical expression evaluated at the previous step;

means for numerically evaluating each mathematical expression in the electronic book that does not include the symbolic evaluation operator;

means for displaying in the electronic book results of the numeric evaluation of each mathematical expression evaluated at the previous step;

means for editing one or more mathematical expressions in the electronic book; and means, utilizing said symbolic dependency graph and numeric dependency graph, for automatically updating the electronic book whenever a mathematical expression is edited to correctly re-display results of numeric calculations and results of symbolic calculations.

19. For use with an electronic book, a computer-based method for performing live symbolic mathematical operations and for editing and processing mathematical expressions, the method comprising the steps of:

displaying the electronic book on an output device of a computer, the electronic book including a table of contents with hyperlinks to sections of the electronic book;

providing a symbolic evaluation operator signifying that a mathematical expression is to be evaluated symbolically;

displaying mathematical expressions in standard mathematical form in the electronic book, a subset of the mathematical expressions comprising the symbolic evaluation operator;

maintaining a dependency graph so that the dependency graph continuously represents mathematical dependencies between the mathematical expressions in the electronic book;

symbolically evaluating each mathematical expression in the electronic book that includes the symbolic evaluation operator;

displaying in the electronic book results of the symbolic evaluation of each mathematical expression evaluated at the previous step;

editing one or more mathematical expressions in the electronic book; and automatically updating the electronic book whenever a mathematical expression is edited, said automatically updating step including the substeps of:

automatically updating the dependency graph to include the edited one or more mathematical expressions, automatically ascertaining a subset of mathematical expressions that include the symbolic evaluation operator that need to be updated, and automatically symbolically evaluating each mathematical expression in the subset of mathematical expressions ascertained at the previous substep.

20. The method of claim 19 wherein the step of symbolically evaluating each mathematical expression comprises the step of utilizing the dependency graph to ascertain all mathematical expressions on which each mathematical expression directly and indirectly depends.

21. The method of claim 19 wherein the step of automatically updating further comprises the substep of automatically displaying in the electronic book results of the automatic symbolic evaluation.

22. The method of claim 19 wherein the substep of automatically ascertaining a subset of mathematical expressions that need to be updated further comprises the step of utilizing the dependency graph to ascertain the subset of mathematical expressions that need to be updated.

* * * * *